United States Patent
Xia et al.

(10) Patent No.: US 12,191,969 B2
(45) Date of Patent: Jan. 7, 2025

(54) DEVICE/UE-ORIENTED BEAM RECOVERY AND MAINTENANCE MECHANISMS

(71) Applicant: Futurewei Technologies, Inc., Plano, TX (US)

(72) Inventors: Pengfei Xia, San Diego, CA (US); Bin Liu, San Diego, CA (US); Nathan Edward Tenny, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 17/453,757

(22) Filed: Nov. 5, 2021

(65) Prior Publication Data
US 2022/0060244 A1    Feb. 24, 2022

Related U.S. Application Data

(63) Continuation of application No. 16/800,095, filed on Feb. 25, 2020, now Pat. No. 11,171,708, which is a
(Continued)

(51) Int. Cl.
*H04B 7/08*    (2006.01)
*H04B 7/06*    (2006.01)
(Continued)

(52) U.S. Cl.
CPC ........... *H04B 7/0834* (2013.01); *H04B 7/061* (2013.01); *H04B 7/0695* (2013.01); *H04B 7/088* (2013.01);
(Continued)

(58) Field of Classification Search
CPC .... H04B 7/0834; H04B 7/061; H04B 7/0695; H04B 7/088; H04W 72/0413; H04W 72/042; H04W 72/046
See application file for complete search history.

(56) References Cited

U.S. PATENT DOCUMENTS 9,253,592 B1    2/2016  Moscovich et al.
2004/0077379 A1  4/2004  Smith et al.
(Continued)

FOREIGN PATENT DOCUMENTS

CN    102122977 A    7/2011
CN    103875191 A    6/2014
(Continued)

OTHER PUBLICATIONS

Nokia et al., "Beam Recovery in Nr", 3GPP TSG-RAN WG2 Meeting #96, R2-167713, Nov. 14-18, 2016, 4 Pages, Reno, USA.
(Continued)

*Primary Examiner* — Keith Ferguson
(74) *Attorney, Agent, or Firm* — Slater Matsil, LLP

(57) ABSTRACT

Aspects of this disclosure provide techniques for detecting and recovering from beam-failure events. In some embodiments, motion sensor information generated by motion sensors on a UE is used to detect, predict, and/or recover from a beam failure event that results, or would otherwise result, from movement of the UE. The motion sensor information may be used to adjust a current beam direction used by the UE to transmit or receive a signal, or to determine a recommendation for adjusting a current beam direction of the base station. The motion sensor information may be generated by any sensor that detects a movement of the UE, such as a gyroscope, an accelerometer, a magnetometer, a global positioning system (GPS) sensor, a global navigation satellite system (GNSS) sensor, or any other device that detects a change in position/orientation of the UE.

24 Claims, 9 Drawing Sheets

Related U.S. Application Data continuation of application No. 15/681,087, filed on Aug. 18, 2017, now Pat. No. 10,601,492.

(60) Provisional application No. 62/453,827, filed on Feb. 2, 2017, provisional application No. 62/442,836, filed on Jan. 5, 2017.

(51) Int. Cl.
*H04W 72/21* (2023.01)
*H04W 72/23* (2023.01)
*H04W 72/044* (2023.01)

(52) U.S. Cl.
CPC ........... *H04W 72/21* (2023.01); *H04W 72/23* (2023.01); *H04W 72/046* (2013.01)

(56) References Cited

U.S. PATENT DOCUMENTS

| | | | |
|---|---|---|---|
| 2012/0127947 A1 | 5/2012 | Usui | |
| 2012/0163305 A1 | 6/2012 | Nimbalker et al. | |
| 2013/0039345 A1 | 2/2013 | Kim et al. | |
| 2013/0040682 A1 | 2/2013 | Chang et al. | |
| 2013/0258885 A1* | 10/2013 | Yu | H04W 74/08 370/252 |
| 2015/0004918 A1 | 1/2015 | Wang et al. | |
| 2015/0230102 A1 | 8/2015 | Kang et al. | |
| 2015/0230263 A1 | 8/2015 | Roy et al. | |
| 2016/0095102 A1 | 3/2016 | Yu et al. | |
| 2016/0150435 A1 | 5/2016 | Baek et al. | |
| 2016/0192401 A1* | 6/2016 | Park | H04W 72/0453 370/329 |
| 2016/0353510 A1* | 12/2016 | Zhang | H04W 72/085 |
| 2017/0070991 A1 | 3/2017 | Subramanian et al. | |
| 2017/0223552 A1 | 8/2017 | Roy et al. | |
| 2017/0367114 A1* | 12/2017 | Ahn | H04L 5/0091 |
| 2018/0063693 A1 | 3/2018 | Chakraborty et al. | |
| 2018/0123654 A1 | 5/2018 | Park et al. | |
| 2018/0213446 A1 | 7/2018 | Chun et al. | |
| 2018/0302889 A1 | 10/2018 | Guo et al. | |
| 2021/0204265 A1* | 7/2021 | Hakola | H04B 7/0695 |

FOREIGN PATENT DOCUMENTS

| | | | | |
|---|---|---|---|---|
| CN | 104079336 A | * | 10/2014 | ........... H04B 7/0408 |
| CN | 104782055 A | | 7/2015 | |
| CN | 105052199 A | | 11/2015 | |
| JP | 2006217228 A | | 8/2006 | |
| JP | 2014526217 A | | 10/2014 | |
| JP | 2014527749 A | | 10/2014 | |
| JP | 2015527026 A | | 9/2015 | |
| JP | 2016535466 A | | 11/2016 | |
| WO | 2011045828 A1 | | 4/2011 | |
| WO | 2014036150 A1 | | 3/2014 | |

OTHER PUBLICATIONS

LG Electronics, "Discussion on multi-carrier operation between LTE and NR", 3GPP TSG RAN WG1 Meeting #87, R1-1611783, Nov. 14-18, 2016, 4 Pages, Reno, USA.

* cited by examiner

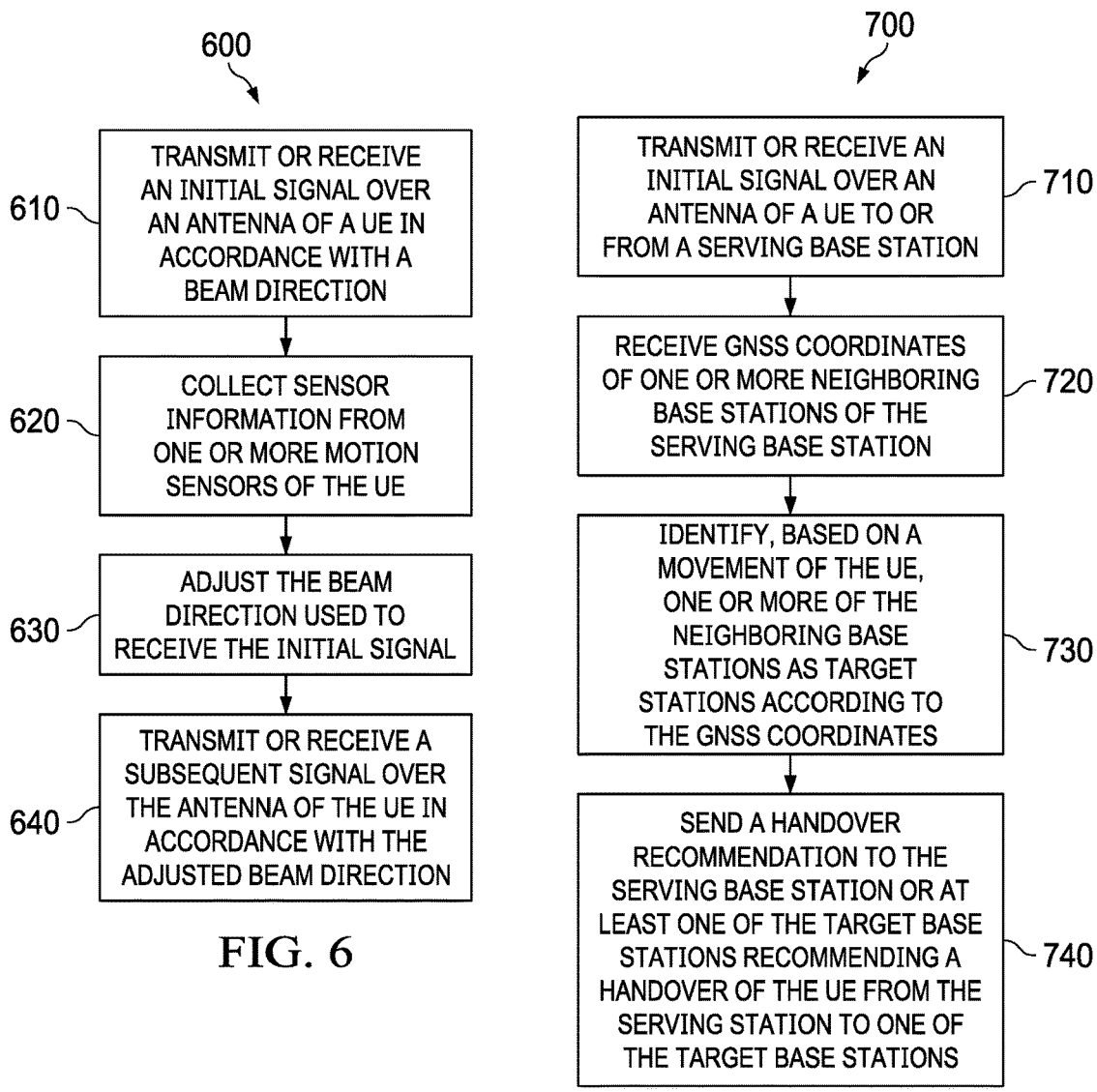
FIG. 6
FIG. 7
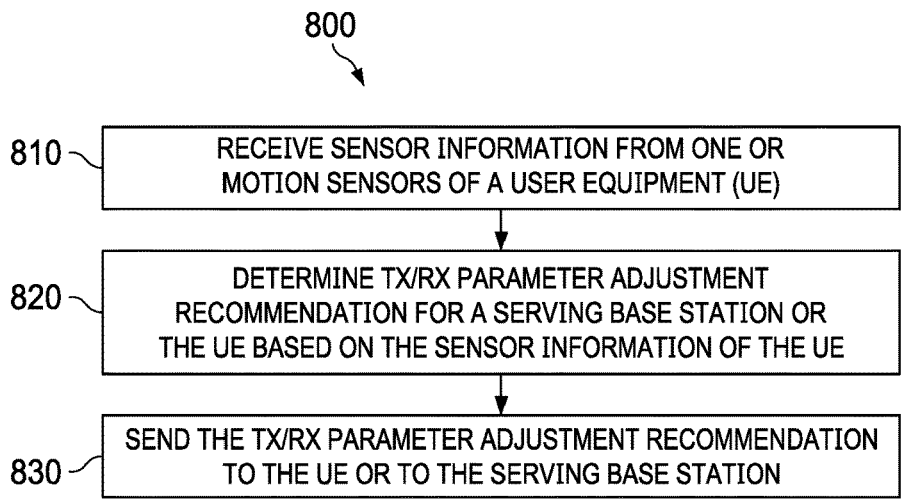
FIG. 8

DEVICE/UE-ORIENTED BEAM RECOVERY AND MAINTENANCE MECHANISMS

This application is a continuation of U.S. application Ser. No. 16/800,095 filed on Feb. 25, 2020 and entitled "Device/UE-Oriented Beam Recovery and Maintenance Mechanisms," now U.S. Pat. No. 11,171,708 issued on Nov. 9, 2021, which is a continuation of U.S. application Ser. No. 15/681,087 filed on Aug. 18, 2017 and entitled "Device/UE-Oriented Beam Recovery and Maintenance Mechanisms," now U.S. Pat. No. 10,601,492 issued on Mar. 24, 2020, which claims priority to U.S. Provisional Patent Application 62/442,836 filed on Jan. 5, 2017 and entitled "Device/UE-Oriented Beam Recovery and Maintenance Mechanisms" and U.S. Provisional Patent Application 62/453,827 filed on Feb. 2, 2017 and entitled "System and Method for Device Oriented Beam Recovery Triggering," all of which are incorporated herein by reference as if reproduced in their entireties.

TECHNICAL FIELD

The present invention relates generally to telecommunications, and in particular embodiments, for device/UE-oriented beam recovery and maintenance mechanisms.

BACKGROUND

In Fourth generation (4G) Long Term Evolution (LTE) networks, beamforming is generally only performed by the base station. Fifth Generation (5G) wireless networks will likely use higher carrier frequencies, such as millimeter Wave (mmW) signals, which tend to exhibit high free-space path loss. To compensate for high path loss rates, 5G wireless networks will likely use beamforming at both the base station and user equipment (UE). For example, a base station may use a transmit (TX) beam direction to transmit a downlink signal, and the UE may use a receive (RX) beam direction to receive the downlink signal. Likewise, the UE may use a TX beam direction to transmit an uplink signal, and the base station may use an RX beam direction to receive the uplink signal. As used herein, the term "beam direction" refers to a radio antenna pattern that is used for directional signal transmission and/or reception. Notably, due to spatial reciprocity, a beam direction used by a device to transmit a signal will generally offer similar levels of spatial performance when used by the device to receive a signal. Accordingly, a base station may use the same beam direction to transmit downlink signals and receive uplink signals, and a UE may use the same beam direction to transmit uplink signals and receive downlink signals.

SUMMARY

Technical advantages are generally achieved, by embodiments of this disclosure which describe device/UE-oriented beam recovery and maintenance mechanisms.

In accordance with an embodiment, a method for adjusting transmission and/or reception parameters is provided. In this embodiment, the method includes transmitting or receiving an initial signal over an antenna of a user equipment (UE) to or from a base station, collecting motion sensor information from one or more motion sensors of the UE, determining a transmission or reception (TX/RX) parameter adjustment for the base station based on the motion sensor information, and sending a UE-initiated recommendation to a base station, the UE-initiated recommendation recommending that the base station make the TX/RX parameter adjustment prior to transmitting or receiving a subsequent signal from to or from the UE. In one example, the one or more motion sensors include a gyroscope, an accelerometer, a magnetometer, a global navigation satellite system (GNSS) sensor, or a combination thereof. In that example, or another example, determining the TX/RX parameter adjustment comprises classifying a movement of the UE based on the motion sensor information, and determining the TX/RX parameter adjustment based on the classification of the UE movement. Classifying the movement of the UE may include classifying the movement as a UE displacement or a UE rotation. Optionally, in any one of the preceding examples, or in another example, the UE-initiated recommendation recommends that the base station adjust a beam direction used to transmit or receive the initial signal prior to transmitting or receiving the subsequent signal.

In accordance with another embodiment, another method for adjusting transmission and/or reception parameters is provided. In this embodiment, the method includes transmitting or receiving an initial signal over an antenna of a user equipment (UE) in accordance with a beam direction, collecting motion sensor information from one or more motion sensors of the UE, adjusting, by the UE, the beam direction used to receive the initial signal, based at least in part on the motion sensor information, and transmitting or receiving a subsequent signal over the antenna of the UE in accordance with the adjusted beam direction. In one example, the one or more motion sensors include a gyroscope, an accelerometer, a magnetometer, a global navigation satellite system (GNSS) sensor, or a combination thereof.

In accordance with an embodiment, a method for transmitting a signal is provided. In this embodiment, the method includes transmitting a first uplink signal from a UE to a base station. The first uplink signal indicates that a UE-initiated beam failure event has occurred. In one example, the first uplink signal is transmitted over an uplink random access channel that spans different time-frequency resources than a physical random access channel (PRACH) used for initial access. In such an example, wherein the first uplink signal may include a unique preamble sequence assigned to the UE by the base station. The unique preamble sequence may be one of a plurality of different unique preambles assigned to different UEs for signaling UE-initiated beam failure events over the random access channel, and the plurality of different unique preambles may be used by the base station to identify which UE transmitted a given UE-initiated beam failure event indication. The unique preamble sequence may have been assigned to the UE by the base station at an earlier time instant. Optionally, in any one of the preceding examples, or in another example, the first uplink signal is transmitted over an uplink grant-based access channel. Optionally, in any one of the preceding examples, or in another example, the grant-based access channel is a physical uplink control channel (PUCCH) or a physical uplink shared channel (PUSCH). Optionally, in any one of the preceding examples, or in another example.

The method further includes monitoring a plurality of downlink channels for downlink reference signals transmitted by the base station, where at least some of the downlink channels being associated with different beam directions, and detecting the UE-initiated beam failure event upon determining that none of the downlink reference signals, having a received signal quality or power level that exceeds a quality or power threshold, have been received over the downlink channels prior to expiration of a time-out period. In such an example, the quality or power threshold may correspond to a level required for reliable reception of a downlink reference signal, the downlink channels may be associated with one or more frequencies, and/or the first uplink signal may be transmitted over a frequency that is different than the one or more frequencies associated with the downlink channels. Optionally, in any one of the preceding examples, or in another example, the downlink channels include physical downlink control channels (PDCCHs), physical downlink shared channel (PDSCHs), or combinations thereof.

Optionally, in any one of the preceding examples, or in another example, the method further includes monitoring one or more downlink channels for a plurality downlink reference signals transmitted by the base station, at least some of the downlink reference signals being associated with different beam directions, and detecting the UE-initiated beam failure event upon determining that none of the downlink reference signals, having a received signal quality or power level that exceeds a quality or power threshold, have been received over the one or more downlink channels prior to expiration of a time-out period.

Optionally, in any one of the preceding examples, or in another example, the method further includes transmitting uplink reference signals over a plurality of uplink channels, at least some of the uplink channels being associated with different beam directions, and detecting the UE-initiated beam failure event upon determining that no acknowledgement messages associated with the uplink reference signals have been detected prior to expiration of a time-out period.

Optionally, in any one of the preceding examples, or in another example, the first uplink signal further includes a UE-initiated recommendation for recovering from the UE-initiated beam failure event. In such an example, the UE-initiated recommendation may include a recommendation for changing a beam direction being used by the base station for transmitting or receiving data to or from the UE. In the same example, the recommendation for changing the beam direction may be indicated by an index in the UE-initiated recommendation. Optionally, in any one of the preceding examples, or in another example, the UE-initiated recommendation includes a recommendation to initiate a new beam management procedure.

Optionally, in any one of the preceding examples, or in another example, the UE-initiated recommendation recommends initiating a handover of the UE from the base station to another base station.

BRIEF DESCRIPTION OF THE DRAWINGS

For a more complete understanding of the embodiments disclosed herein, and the advantages thereof, reference is now made to the following descriptions taken in conjunction with the accompanying drawings, in which:

FIG. 6 is a flowchart of a method for using motion sensor information to update a beam direction of a UE;

FIG. 7 is a flowchart of a method for using GNSS coordinates of neighboring base stations to initiate a handover of a UE from a serving base station to a target base station;

FIG. 8 is a flowchart of a method for using motion information of a UE to determine a TX/RX parameter adjustment recommendation for a serving base station or the UE at a location server;

DETAILED DESCRIPTION OF ILLUSTRATIVE EMBODIMENTS

Figure 1:
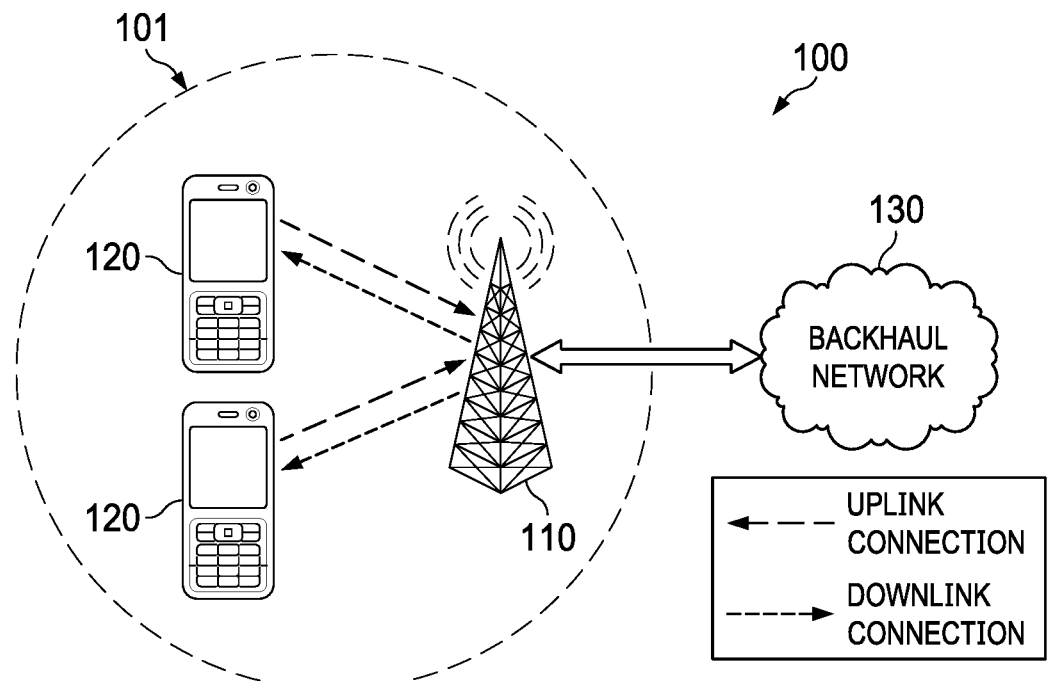
FIG. 1 is a diagram of a wireless communications network.

The structure, manufacture and use of embodiments are discussed in detail below. It should be appreciated, however, that this disclosure provides many applicable inventive concepts that can be embodied in a wide variety of specific contexts. The specific embodiments discussed are merely illustrative of specific ways to make and use the invention, and do not limit the scope of the invention.

In addition to using beamforming to both transmit and receive signals, 5G wireless networks will likely use finer beam directions than 4G LTE networks in order to achieve sufficient antenna gain. Fine beam directions direct more of the beam's power toward the borescope of the primary lobe of the antenna pattern than coarse beam directions, thereby enabling fine beam directions to exhibit higher antenna gain than coarse beam directions when there is a relatively small angular distance between the target device and the borescope of the corresponding beam direction. The terms "fine beam direction" and "coarse beam direction" are relative terms that are used in the detailed description, and should not be construed to limit the scope of the claims. However, this also renders fine beam directions more susceptible to beam blockage conditions and/or reductions in quality of service (QoS) than coarse beam directions as the angular distance between the target device and the borescope of the corresponding beam direction increases due to movement of the UE.

Conventional beam management schemes generally rely on beam-scanning techniques to adjust the beam direction being used to transmit or receive a data signal in a manner that compensates for UE movement and/or changes in the condition of the air interface. As used herein, the term "current beam direction" refers to a beam direction that is being used by a UE to transmit or receive a data signal. Beam-tracking techniques typically rely communicate reference signals in beam directions that have boresights which are slightly offset from a boresight of the current beam direction used by the UE and/or base station. The receive power or quality level of the reference signals are then compared to the received power or quality level of the data signal to determine whether the current beam direction needs to be adjusted. Beam-tracking techniques may offer relatively good performance when UEs are moving at relatively slow rates of speed and/or the condition of the air interface is relatively static. However, when UEs are moving/rotating at high rates of speed or the condition of the air interface is changing rapidly, beam-tracking may be unable to update the beams quickly enough, and a beam failure event may occur.

Aspects of this disclosure provide techniques for detecting and recovering from beam-failure events. In some embodiments, motion sensor information generated by motion sensors on a UE is used to detect, predict, and/or recover from a beam failure event that results, or would otherwise result, from movement of the UE. In one example, motion sensor information is used to adjust a current beam direction used by the UE to transmit or receive a signal. In another embodiment, motion sensor information is used to determine a recommendation for adjusting a current beam direction of the base station, which may then be communicated to the base station via a UE-initiated recommendation. The motion sensor information may be generated by any sensor that detects a movement of the UE, such as a gyroscope, an accelerometer, a magnetometer, a global positioning system (GPS) sensor, a global navigation satellite system (GNSS) sensor, or any other device that detects a change in a position or orientation of the UE. Because motion sensors are generally more sensitive, and responsive, to UE movement than reference signal measurements alone due to, inter alia, propagation delay of the air interface, using motion sensor information for beam management may reduce the time required to detect and recover from a beam failure event. Although much of this disclosure discusses using motion sensor information generated by a motion sensors of a UE to adjust beam directions of the UE and/or base station, it should be appreciated that motion sensor information may be used to adjust any transmission or reception (TX/RX) parameter of the UE and/or base station, as well as to trigger a handover from a serving base station to a target base station.

In other embodiments of this disclosure, reference signals are communicated over channels associated with different beam directions in order to detect a UE-initiated beam failure event and/or trigger a UE-initiated beam recovery procedure. In one example, a UE transmits uplink reference signals over uplink channels associated with different uplink TX and/or RX beam directions. The UE then determines whether the base station returns an acknowledgement message associated with one of the uplink reference signals prior to expiration of a time-out period. If no acknowledgement messages are received prior to expiration of the time-out period, then the UE detects a UE-initiated beam failure event, and sends a signal indicating that the UE-initiated beam failure event has occurred to the base station. In another example, the base station communicates downlink reference signals over downlink channels associated with different uplink TX and/or RX beam directions. The UE monitors the downlink channels, and if none of the downlink reference signals are detected prior to expiration of the time-out period, the UE detects a UE-initiated beam failure event, and sends a signal indicating that the UE-initiated beam failure event has occurred to the base station. The signal indicating that the UE-initiated beam failure event has occurred may be communicated over grant-free resources, such as a physical random access channel (PRACH) used for initial access or a random access channel that spans different time-frequency resources than the PRACH. Alternatively, the signal indicating that the UE-initiated beam failure event has occurred may be communicated over a physical uplink control channel (PUCCH) or a physical uplink shared channel (PUSCH). These and other inventive aspects are discussed in greater detail below.

FIG. 1 is a network 100 for communicating data. The network 100 comprises a base station 110 having a coverage area 101, a plurality of UEs 120, and a backhaul network 130. As shown, the network base station no establishes uplink (dashed line) and/or downlink (dotted line) connections with the user equipments (UEs) 120, which serve to carry data from the UEs 120 to the network base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a transmit receive point (TRP), an enhanced Node B (eNB), a macro-cell, a femtocell, a Wi-Fi access point (AP), or other wirelessly enabled devices. Base stations may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

In some embodiments, motion sensor information generated by one or more motion sensors of a UE may be used to classify a UE movement. For example, motion sensor information may be used to classify the UE movement as a UE rotation or a UE displacement. Other classifications are also possible. Classifying the UE movement may be useful in beam recovery and/or adjustment because different beam management techniques may be used for different types of UE movement classifications. By way of example, a beam blockage, or reduction in QoS, arising from UE rotation may generally be addressed by shifting the beam direction of the UE in the opposite clockwise or counterclockwise direction as the UE rotation (e.g., beam direction is shifted in the counter-clockwise direction when the UE rotates in the clockwise direction, and vice versa) while maintaining the beam direction of the base station. As another example, a beam blockage, or reduction in QoS, arising from UE displacement may generally be addressed by adjusting the beam direction of the UE and the beam direction of the base station in the same clockwise or counter-clockwise directions.

FIGS. 2A-2D are diagrams that show how different beam management techniques may be used to adjust beam directions used to transmit and receive downlink data signals for different classifications of UE movement. Although the examples described in reference to FIGS. 2A-2D describe beam management in the context of downlink signals, it should be appreciated that the same concepts apply to uplink signals, as well as other types of beamformed signals, e.g., device to device (D2D) wireless signals, backhaul wireless signals.

Figure 2A:
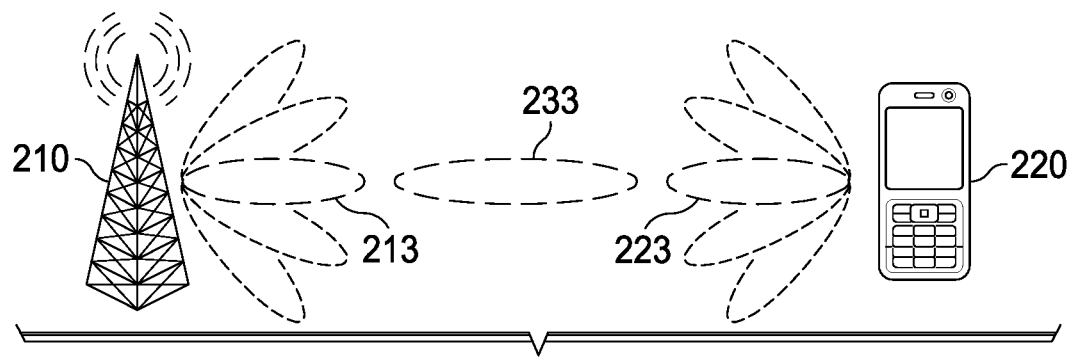
FIGS. 2A-2E are diagrams depicting how different beam management solutions may be used to adjust beam directions in a manner that mitigates beam blockage conditions for different classifications of UE movement.

FIG. 2A depicts the transmission of an initial downlink signal 233 from the base station 210 to the UE 220. The base station 210 uses the beam direction 213 to transmit the initial downlink signal 233, and the UE 220 uses the beam direction 223 to receive the downlink signal.

Figure 2B:
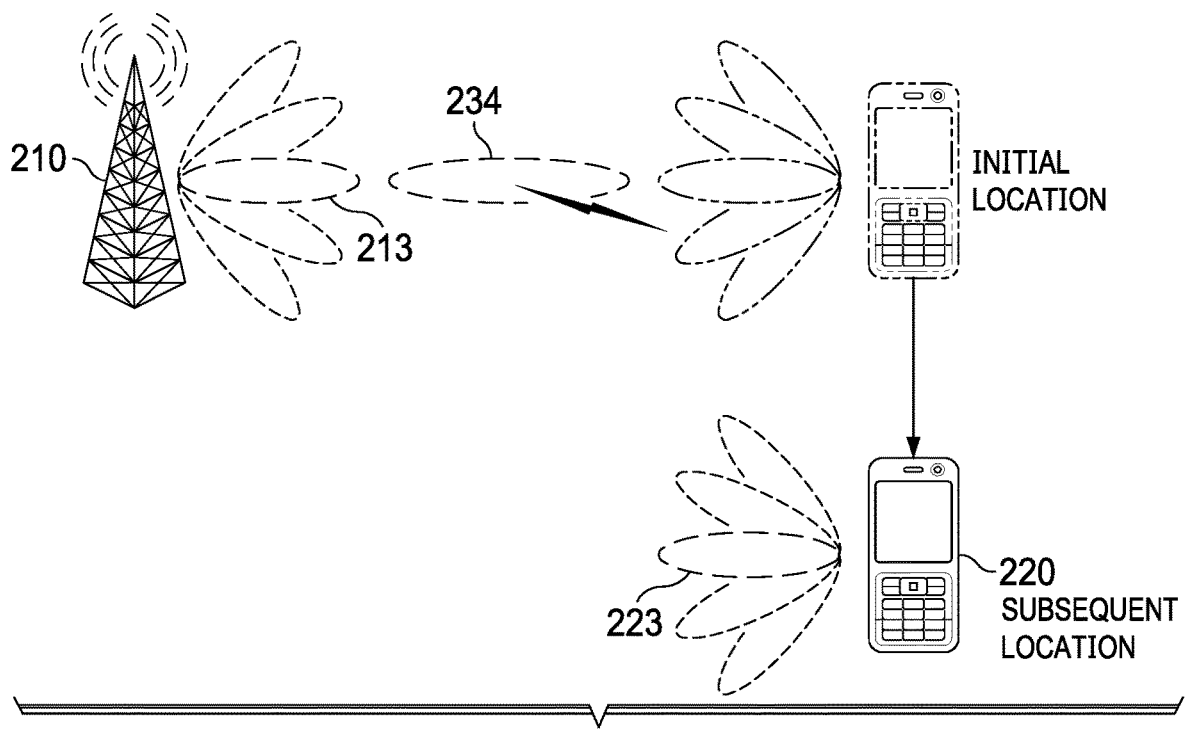

FIG. 2B depicts a beam blockage condition that occurs during transmission of a subsequent downlink signal 234 from the base station 210 to the UE 220 after displacement of the UE 220 from an initial location to a subsequent location. In this example, the subsequent downlink signal 234 is transmitted and received using the same beam directions 213, 223 (respectively) that were used to transmit and receive the initial downlink signal 233. The beam directions 213, 223 do not provide sufficient antenna gain when the UE 220 is located at the subsequent location, and as result the UE 220 cannot successfully receive/decode the subsequent downlink signal 234.

Figure 2C:
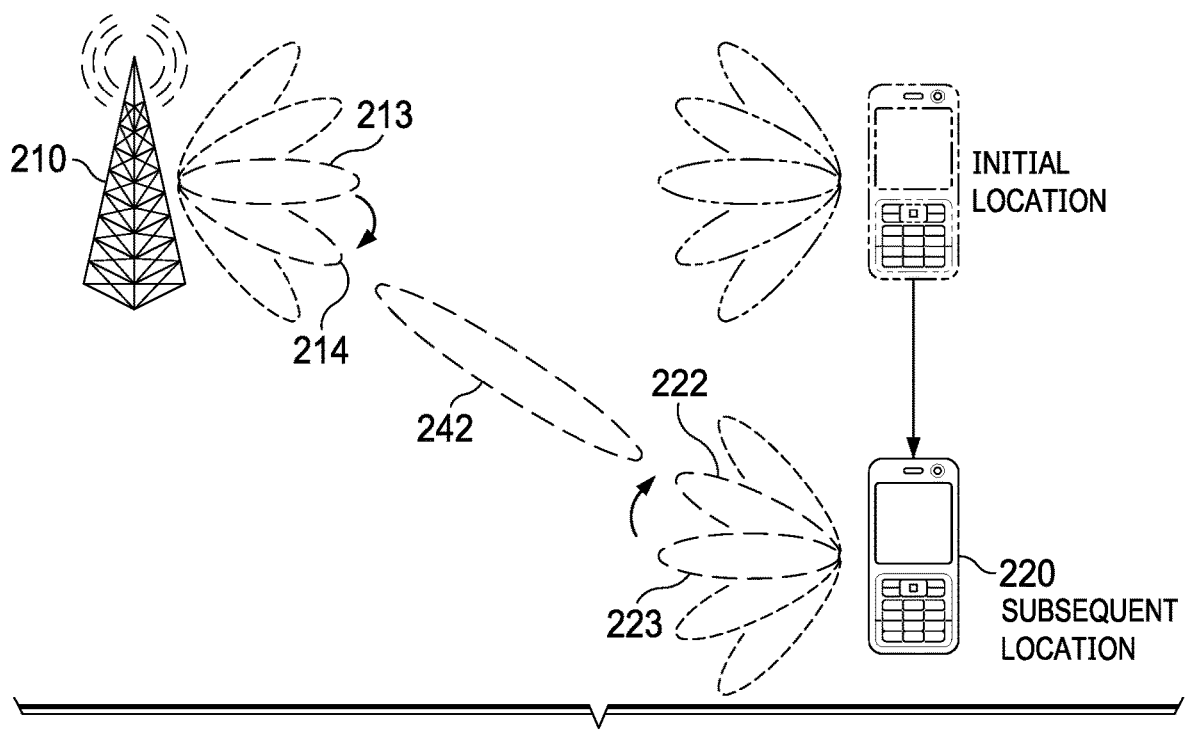

FIG. 2C depicts a beam adjustment technique that avoids the beam blockage condition following the displacement of the UE 220 from an initial location to a subsequent location. As shown, when a UE displacement movement occurs, beam blockage can be avoided by shifting/adjusting the current beam direction used by the UE in the opposite direction than the current beam direction used by the base station. In this example, the base station shifts its current beam direction in the clockwise direction from the beam direction 213 to the beam direction 214 prior to transmitting the subsequent downlink signal 242, and the UE 220 shifts its current beam direction in the clockwise direction from the beam direction 223 to the beam direction 222 prior to receiving the subsequent downlink signal 242. The antenna gain provided by the beam directions 214, 222 when the UE 220 is located at the subsequent location is sufficient to allow the UE 220 to successfully receive, and decode, the subsequent downlink signal 242.

Figure 2D:
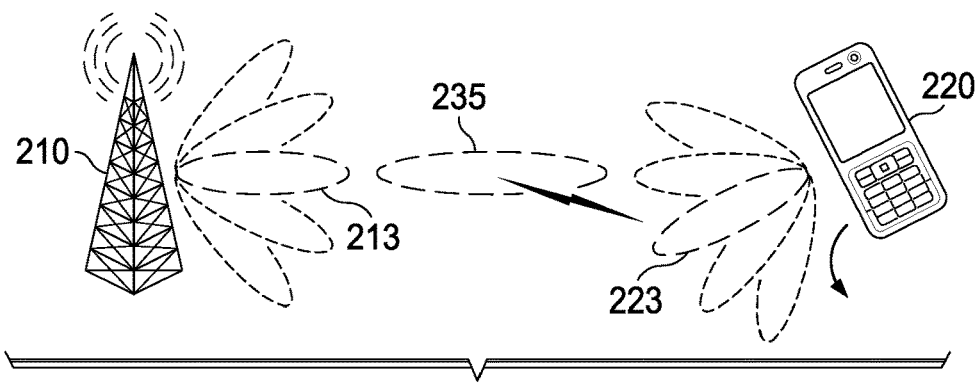

FIG. 2D depicts a beam blockage condition that occurs during transmission of a subsequent downlink signal 235 after rotation of the UE 220. Similar to FIG. 2B, the subsequent downlink signal 235 is transmitted and received by the base station 210 and the UE 220 using the same beam directions 213, 223 (respectively) that were used to transmit and receive the initial downlink signal 233, and the combination of beam directions 213 and 223 does not provide sufficient antenna gain to allow the UE 220 to successfully receive the subsequent downlink signal 235 when the UE 220 has its post-rotation orientation.

Figure 2E:
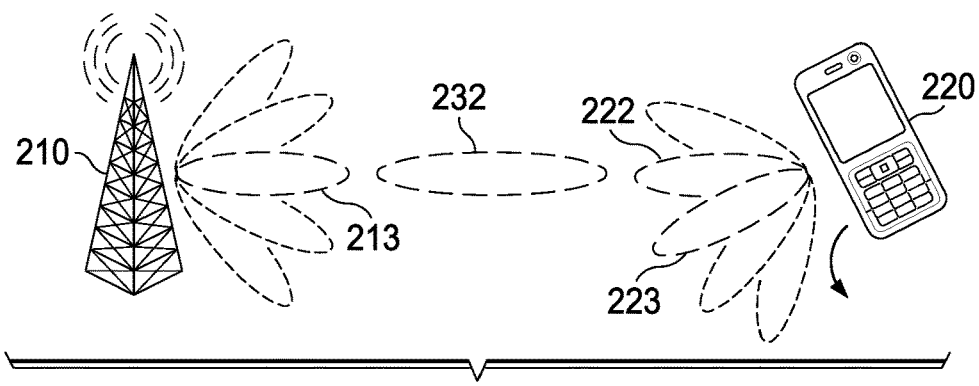

FIG. 2E depicts a beam adjustment technique that avoids the beam blockage condition following the rotation of the UE 220. As shown, when a UE rotation movement occurs, beam blockage can be avoided by shifting the current beam direction of the UE. In this example, the UE 220 shifts its current beam direction from the beam direction 223 to the beam direction 222 prior to receiving the subsequent downlink signal 232. The antenna gain provided by the beam directions 213 and 222 when the UE 220 has its post-rotation orientation is sufficient to allow the UE 220 to successfully receive, and decode, the subsequent downlink signal 232.

As can be appreciated by comparing FIG. 2C and FIG. 2E, the beam adjustment techniques for UE rotation and UE displacement movement classifications are different in so far as UE displacement typically requires that both the UE and the base station adjust their current beam directions, while UE rotation generally only requires the UE to adjust its current beam direction. Although FIGS. 2C and 2E depict embodiment beam management techniques between a mobile UE 220 and a stationary base station 210, it should be appreciated that other embodiment beam management techniques may occur between two mobile devices (e.g., between a mobile UE and a mobile base station, between a mobile UE and a mobile relay station, between two mobile UEs, etc.), and that motion sensor information may be generated by motion sensors on both mobile devices as well as exchanged between the respective mobile devices and/or a location server.

Using sensor information to detect a UE movement may allow the UE and/or base station to initiate beam adjustment procedures more quickly than if they relied solely on beam-tracking reference signals for several reasons. For example, motion sensor information may be more responsive to UE movements due to the propagation delay of the channel. Additionally, the sensor measurements may be used to definitively ascertain the presence of UE movement, while the reference signal measurements may only indicate that the air interface has changed, which could be caused by various factors, such as a physical object passing through the line-of-sight path between the UE and the base station.

Additionally, the sensor measurements may be updated more frequently than the reference signal measurements. For example, the sensor measurements may be generated almost continuously (e.g., every few clock cycles of the move sensor's processor), while reference signals are typically transmitted on a periodic basis (e.g., every ten TTIs, etc.) to reduce the amount of overhead required to perform beam-tracking. Additionally, the sensor measurements may detect smaller amounts of UE movement (e.g., smaller degrees of angular rotation, shorter displacement distances) than reference signal measurements depending on the sensitivity of the movement sensors. For these and other reasons, embodiment techniques may be able to initiate beam direction adjustment much closer to the instant in which the UE rotation or displacement begins than conventional beam-tracking techniques that rely solely on reference signal measurements.

An additional benefit is that sensor information allows the UE movement to be classified. This may allow the UE and/or base station to select a beam adjustment solution that is tailored to the classification of the UE movement. For example, if the UE movement is classified as a rotation, then the beam adjustment technique may adjust the beam direction of the UE while maintaining the beam direction of the base station, thereby reducing the time required to perform beam adjustment. Additionally, motion sensor information may allow the UE movement to be quantified, thereby further refining the selection of the adjustment solution. For example, motion sensor information may allow the UE to determine the direction of rotation, as well as to estimate the rate and/or amount of angular rotation, thereby allowing the UE to hone in the appropriate beam direction adjustment more quickly. For these reasons, using motion sensor information to aid in beam management may further mitigate beam blockage, as well as reduce the latency associated with beam recovery following a beam blockage condition.

Figure 3:
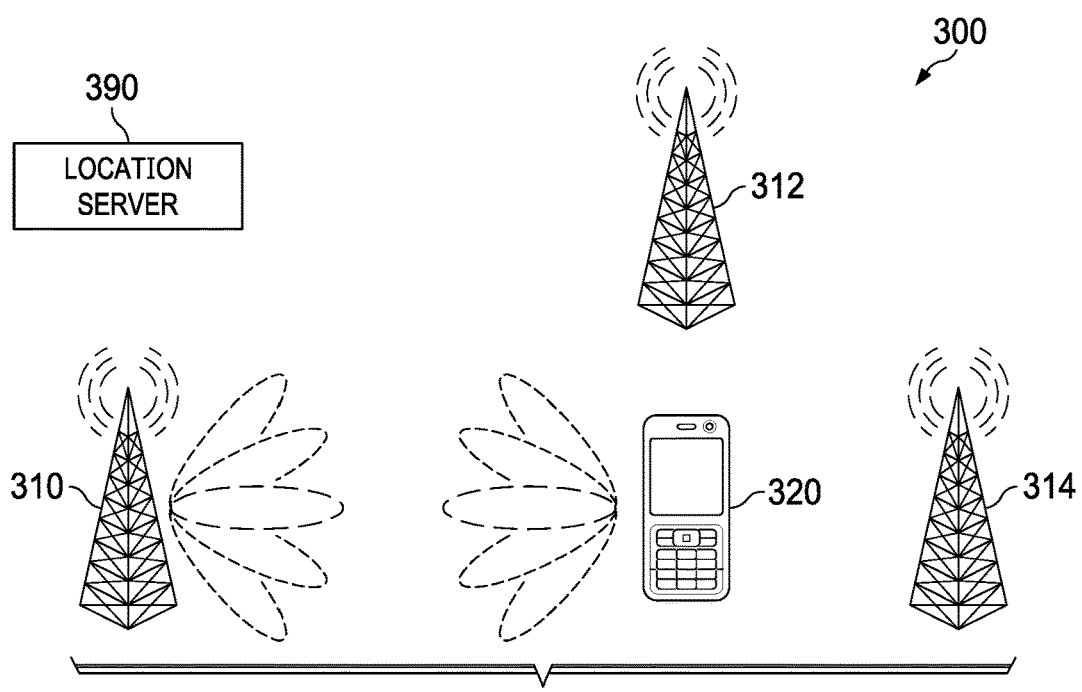
FIG. 3 is a diagram of an embodiment network in which Global Navigation Satellite System (GNSS) coordinates of base stations may be used for beam management or to initiate a handover.

In some embodiments, a UE will use GNSS coordinates of base stations in conjunction with motion sensor information for beam management as well as to determine when a handover is appropriate. FIG. 3 is a diagram of an embodiment network 300 in which GNSS coordinates of base stations may be used for beam management and/or to initiate a handover. In one example, the UE 320 may use GNSS coordinates of the serving base station 310 in conjunction with motion sensor information generated by motion sensors of the UE 320 to determine a beam direction adjustment for the UE 320 and/or a beam direction adjustment recommendation for the base station 310. In another example, the UE 320 uses GNSS coordinates of the serving base station 310 and/or the neighboring base stations 312, 314 in conjunction with motion sensor information generated by motion sensors of the UE 320 to initiate a handover. In some embodiments, the UE 320 may request GNSS coordinates of a subset of neighboring base stations, and the serving base station 310 may provide the GNSS coordinates of neighboring base stations in the subset specified by the UE 320 without providing GNSS coordinates of neighboring base stations excluded from the subset specified by the UE 320. In yet other embodiments, the location server 390 may receive motion information from the UE 320, and process it to determine beam direction adjustments and/or to initiate handovers.

Figure 4:
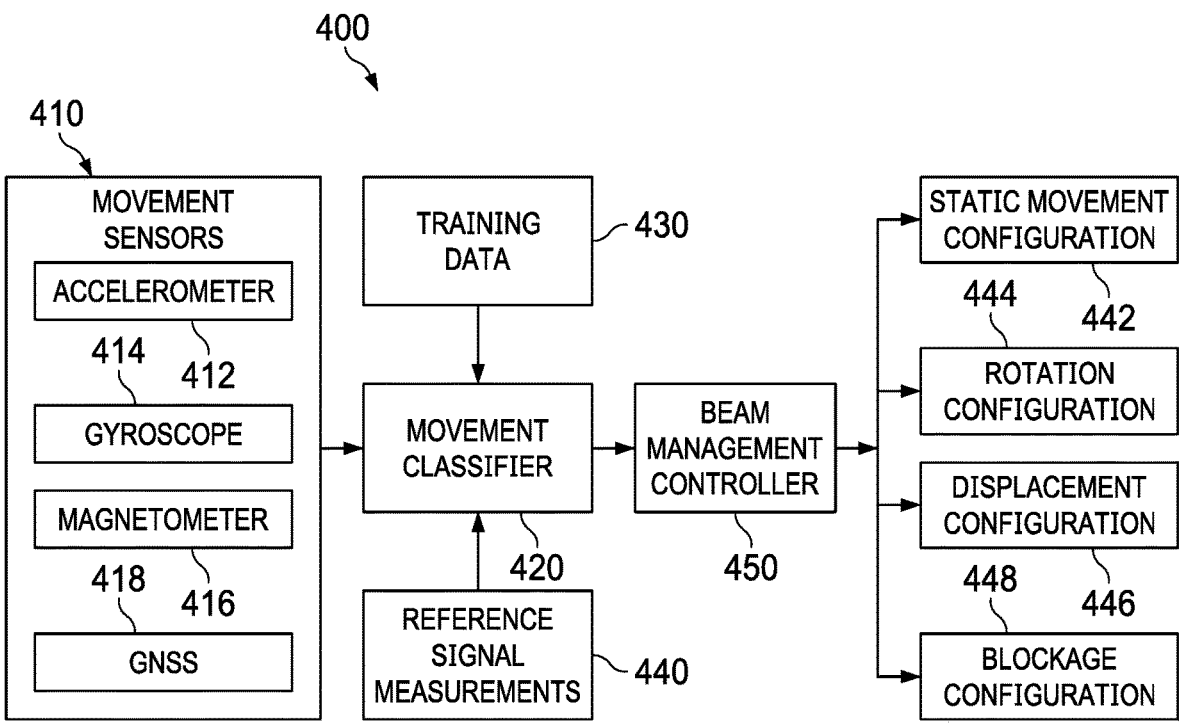
FIG. 4 is a block diagram of an embodiment UE configured to perform beam management based on movement sensor information.

FIG. 4 is a diagram of an embodiment UE 400 configured to perform beam management based on sensor information of movement sensors 410 of the UE 400. The movement sensors 410 may include an accelerometer 412, a gyroscope 414, a magnetometer 416, and a GNSS sensor 418. The accelerometer 412 may include any component or collection of components that measures physical acceleration experienced by the UE 400. The gyroscope 414 may include any component or collection of components that measures an orientation of the UE 400. The magnetometer 416 may include any component or collection of components that measures the orientation of the UE 400 relative to the earth, e.g., similar to the way a compass gauges direction. The GNSS sensor 418 may include any component or collection of components that gauges a geo-spatial positioning of the UE 400 based at least in part on signals received from a GNSS.

The UE 400 further includes a movement classifier 420. The movement classifier uses sensor information generated by the movement sensors 410, in conjunction with training data 430 reference signal measurements 440, to classify a movement of the UE 400. The UE movement classification is then provided to the beam management controller 450, where it is used to select one or more of a static movement configuration 442, a rotation configuration 444, a displacement configuration 446, and a beam blockage configuration 448. The static movement configuration 442 may specify one or more beam management techniques that may be implemented when the UE 400 is static, or is moving/rotating at relatively low rates of speed. The rotation configuration 444 may specify one or more beam management techniques that may be implemented when the UE 400 is rotating at an angular velocity that exceeds a threshold. The displacement configuration 446 may specify one or more beam management techniques that may be implemented when the UE 400 is moving at speed that exceeds a threshold. The beam blockage configuration 448 may specify one or more beam recovery techniques that may be implemented after the UE 400 has experienced a beam blockage condition.

Figure 5:
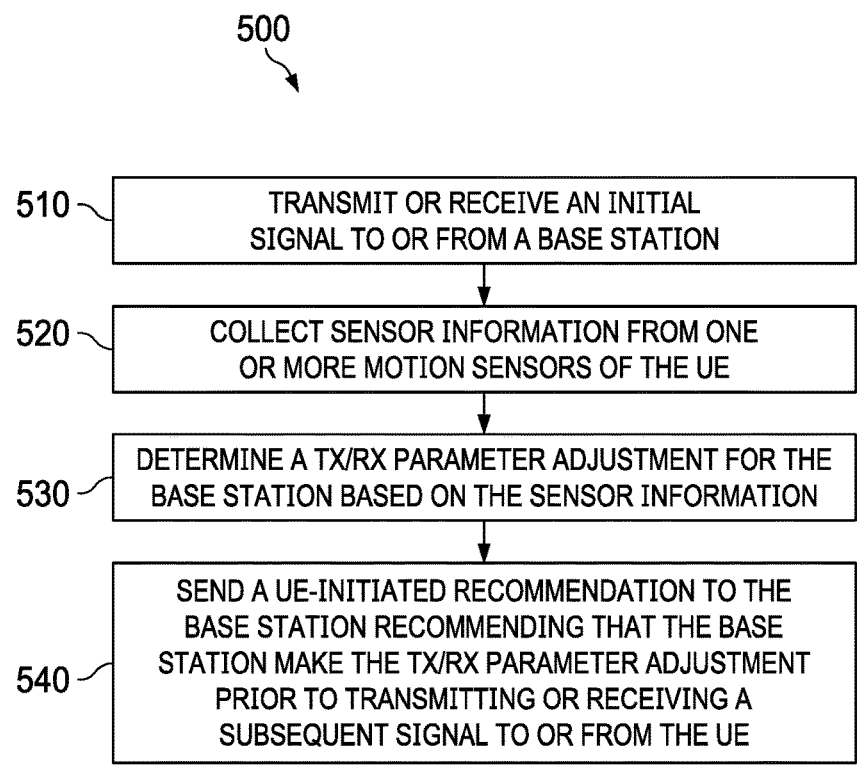
FIG. 5 is a flowchart of a method for using motion sensor information to update TX/RX parameters of a base station.

FIG. 5 is a flowchart of a method 500 for using motion sensor information to update TX/RX parameters of a base station, as may be performed by a UE. At step 510, the UE transmits or receives an initial signal to or from a base station. At step 520, the UE collects sensor information from one or more motion sensors of the UE. At step 530, the UE determines a TX/RX parameter adjustment for the base station based on motion sensor information. In an embodiment, the UE determines the TX/RX parameter adjustment by classifying a movement of the UE based on the motion sensor information, and determining the TX/RX parameter adjustment recommendation based on the classification of the UE movement. The UE may classify the UE movement directly without external assistance. At step 540, the UE sends a UE-initiated recommendation to the base station recommending that the base station perform the TX/RX parameter adjustment prior to transmitting or receiving a subsequent signal from to or from the UE.

The UE-initiated recommendation may recommend that the base station adjust a beam direction used to transmit or receive the initial signal prior to transmitting or receiving the subsequent signal by, for example, including a new beam index, a new beam pair index, and/or a new resource index. Alternatively, the UE-initiated recommendation may recommend that the base station adjust a TX/RX scheme used to transmit or receive the initial signal prior to transmitting or receiving the subsequent signal. The UE-initiated recommendation may be transmitted over the same frequency as the initial and/or subsequent signal. Alternatively, the UE-initiated recommendation may be transmitted over a lower carrier frequency, or a higher carrier frequency, than the initial and/or subsequent signal. For instance, the UE-initiated recommendation could be sent over a 4G LTE carrier frequency (e.g., between 0.4 GHz and 6 GHz), and the initial and/or subsequent signal could be transmitted over an mmWave carrier frequency (e.g., above 6 GHz). The UE-initiated recommendation may be transmitted over grant-free resources of a random access channel to reduce latency associated with a grant request. Alternatively, the UE-initiated recommendation may be transmitted over persistently or semi-persistently scheduled resources. In an embodiment, the UE-initiated recommendation is a media access control (MAC) CE command, or physical (PHY) layer control signal.

FIG. 6 is a flowchart of a method 600 for using motion sensor information to update a beam direction of a UE. At step 610, the UE transmits or receives an initial signal to or from a serving base station in accordance with a beam direction. At step 620, the UE collects sensor information from one or more motion sensors of the UE. At step 630, the UE adjusts the beam direction used to transmit or receive the initial signal. At step 640, the UE transmits or receives a subsequent signal over the antenna of the UE in accordance with the adjusted beam direction.

FIG. 7 is a flowchart of a method 700 for using GNSS coordinates of neighboring base stations to initiate a handover of a UE from a serving base station to a target base station. At step 710, the UE transmits or receives an initial signal to or from a serving base station. At step 720, the UE receives GNSS coordinates of one or more neighboring base stations of the serving base station. At step 730, the UE identifies, based on a movement of the UE, one or more of the neighboring base stations as target base stations according to the GNSS coordinates. At step 740, the UE sends a handover recommendation to the serving base station or at least one of the target base stations. The handover recommendation recommends a handover of the UE from the serving base station to one of the target base stations.

FIG. 8 is a flowchart of a method 800 for using motion information of a UE to determine a TX/RX parameter adjustment recommendation for a serving base station or the UE, as may be performed by a location server. At step 810, the location server receives sensor information from one or more motion sensors of the UE. At step 820, the location server determines a TX/RX parameter adjustment recommendation for the serving base station or the UE based on motion sensor information of the UE. At step 830, the UE sends the TX/RX parameter adjustment recommendation to the UE or to the serving base station.

Figure 9:
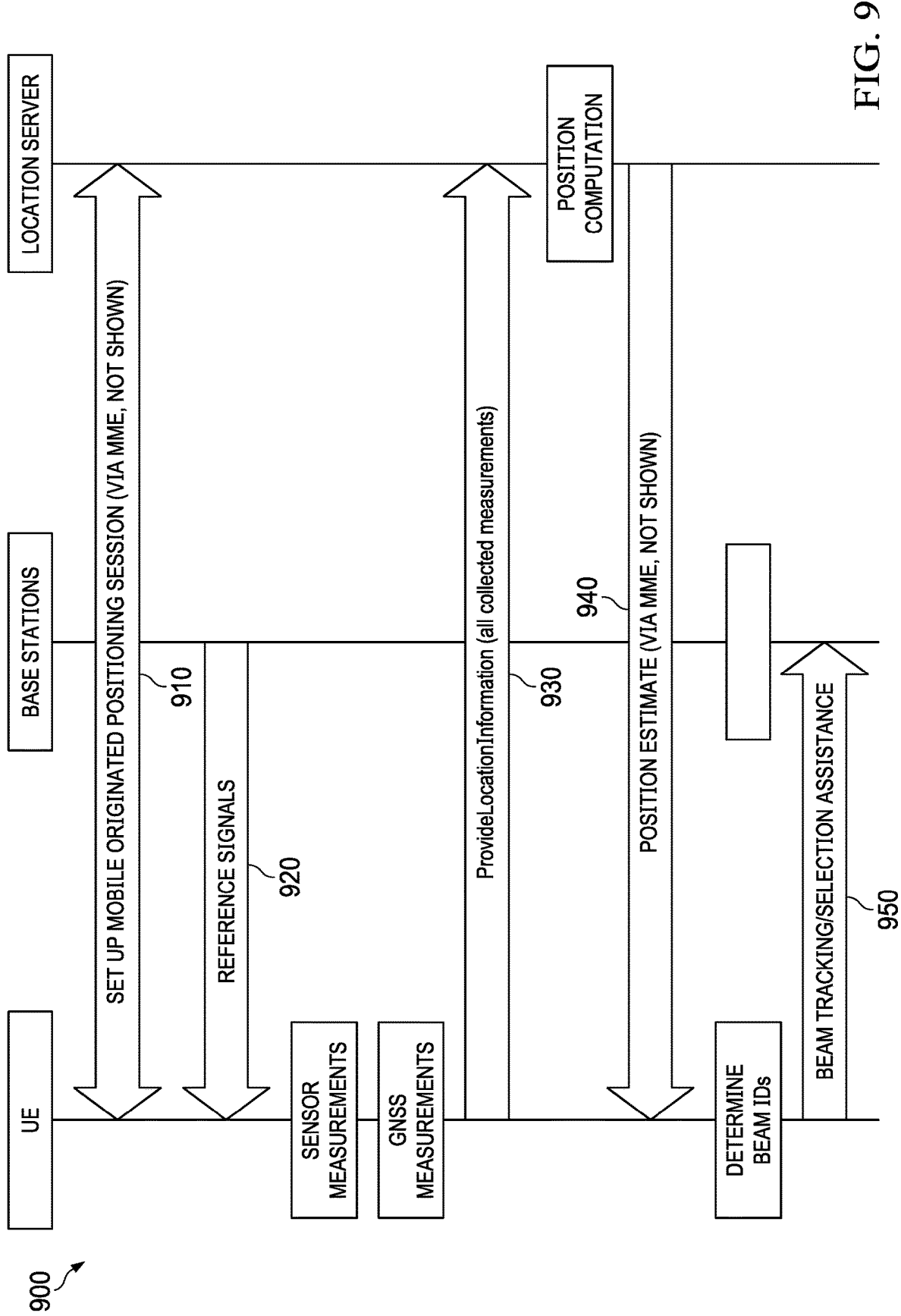
FIG. 9 is a protocol diagram of a communications sequence for using motion information of a UE to determine a TX/RX parameter adjustment recommendation for a serving base station or the UE at a location server.

FIG. 9 is a protocol diagram of a communications sequence for using a location server to provide beam-tracking assistance. As shown, the UE and the location server exchanging signaling 910 to set up a mobile originating positioning session via an MME. Next, the UE receives reference signals 920 from one or more base stations, and determines sensor measurements and GNSS measurements, which are then provided to the location server for position computation. The location server then returns a position estimate 940 that includes angular information to the UE. The UE then determines beam IDs based on the angular information, and sends a signal 950 that includes information relating to beam tracking/selection to at least one of the one or more base stations.

As mentioned above, the movement of a device may lead to a degradation in signal quality. Table 1 illustrates typical angular displacements of a device for several common activities.

TABLE 1

| Activity | Angular displacement in 100 ms (degrees) |
| --- | --- |
| Reading, web browsing | 6-11 |
| Horizontal to vertical changes | 30-36 |
| Playing games | 72-80 |

In some embodiments, motion sensors of a UE detect a UE-initiated beam failure event and/or trigger a UE-initiated beam recovery procedure. In other embodiments, reference signals are communicated over channels associated with different beam direction in order to detect a UE-initiated beam failure event and/or trigger a UE-initiated beam recovery procedure.

In some embodiments, a UE transmits uplink reference signals over uplink channels associated with different uplink transmit and/or receive beam directions, and waits to see if the base station returns an acknowledgement message associated with any of the uplink reference signals. If no acknowledgement message is received prior to expiration of a time-out period, then the UE detect a UE-initiated beam failure event, and send a signal to the base station indicating that the UE-initiated beam failure event has occurred. As mentioned above, a UE may send a signal indicating that the UE-initiated beam failure event has occurred. The signal indicating that the UE-initiated beam failure event has occurred may be communicated over grant-free resources, such as a physical random access channel (PRACH) used for initial access or a random access channel that spans different time and/or frequency resources than the PRACH channel. Alternatively, the signal indicating that the UE-initiated beam failure event has occurred may be communicated over a physical uplink control channel (PUCCH) or a physical uplink shared channel (PUSCH).

As mentioned above, at least some of the uplink channels are associated with different transmit or receive beam directions. In one example, the uplink channels are physical uplink control channels ($PUCCH_1, PUCCH_2, \ldots PUCCH_N$), and each PUCCH is associated with an uplink transmit beam $v_{ti}$ and/or an uplink receive beam $v_{ri}$, where t indicates a transmit beam, r indicates a receive beam, and i is the index of the uplink channel. For each eNB and UE pair, the UE determines which uplink transmit beam $v_{ti}$ to associate with a given PUCCH, and the eNB determines which uplink receive beam $v_{ri}$ to associate with a given PUCCH. The UE may transmit a signal (e.g., a reference signal, a command, etc.) over all or some of the PUCCHs using the corresponding uplink transmit beam $v_{ti}$, and the eNB may attempt to detect the signals over all or some of the PUCCHs using the corresponding uplink receive beam $v_{ri}$. When the eNB detects a signal over a particular uplink control channel (e.g., $PUCCH_i$), the eNB sends a positive confirmation command/message to the UE indicating that the corresponding signal was received. If no signal is detected for a particular channel, then the eNB does not send a corresponding positive confirmation to the UE. If upon expiration of a timeout period, the UE has not received any positive confirmation commands from the eNB, then the UE detects that a beam failure event has occurred and/or triggers a beam recovery procedure.

Figure 10:
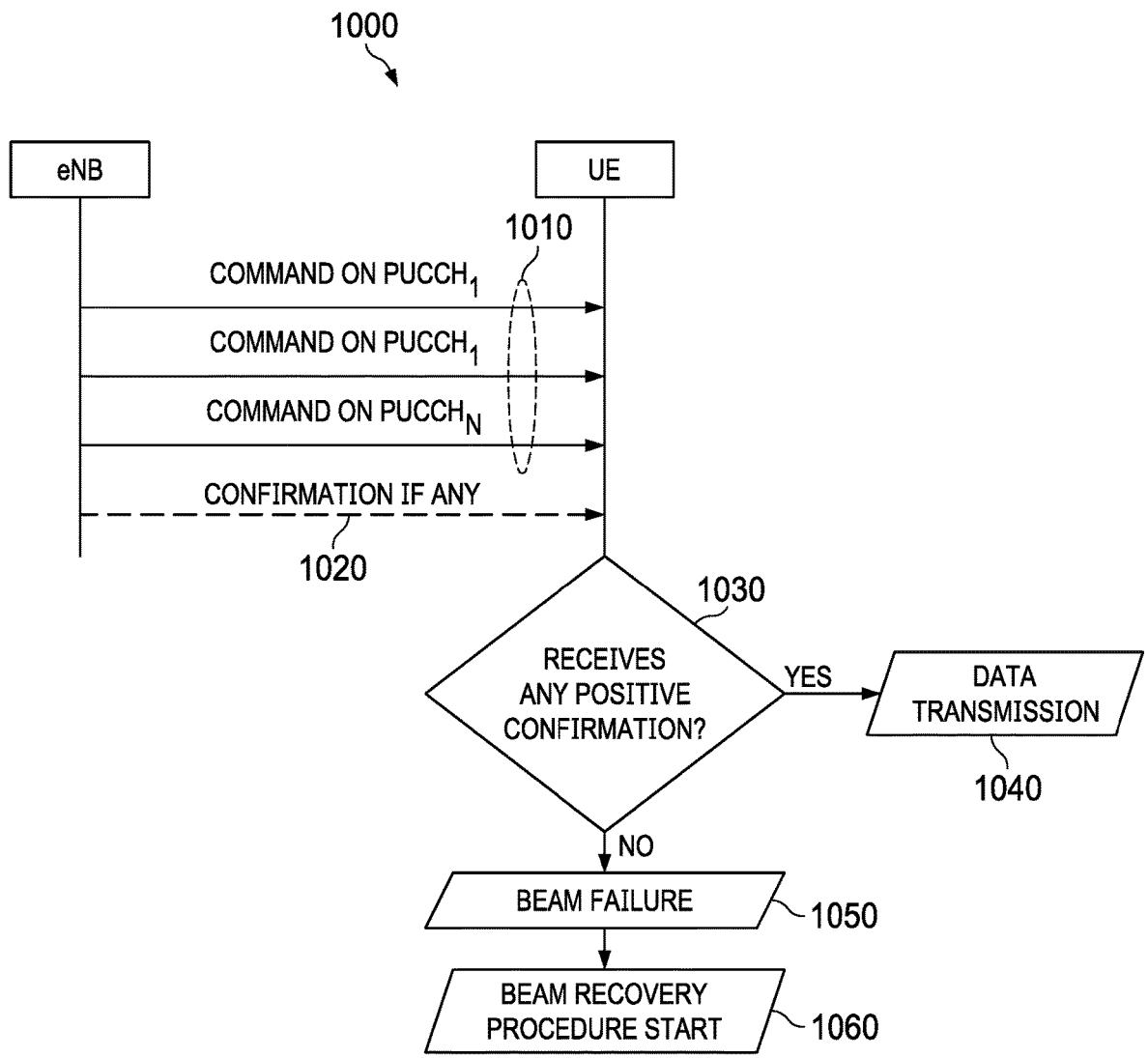
FIG. 10 is a flowchart of an embodiment method for detecting a UE-initiated beam failure event according to uplink reference signal transmissions.

FIG. 10 is a protocol diagram of an embodiment communications sequence 1000 for detecting a beam failure event based on uplink reference signals 1010. As shown, the UE transmits the uplink reference signals 1010 over different PUCCHs in a set of PUCCHs. In some embodiments, the UE uses different uplink transmit beams to transmit the uplink reference signals 1010 over at least some of the PUCCHs, and the eNB uses different uplink receive beams when attempting to detect the uplink reference signals 1010 over at least some of the PUCCHs. In this way, different combinations of TX and RX uplink beams can be evaluated through communication of the uplink reference signals 1010. If the eNB successfully detects one or more of the signals 1010, then the eNB sends one or more confirmation messages 1020 to the UE confirming that the signal was correctly received. In one example, the confirmation messages 1020 include an index associated with the corresponding PUCCH. In another example, the confirmation messages 1020 are transmitted over resources (e.g., PDCCHs, etc.) that are associated with the corresponding PUCCHs, thereby allowing the UE to implicitly determine which PUCCH message was successfully received by the eNB. At step 1030, the UE determines whether at least one confirmation message was received from the base station prior to expiration of a timeout period. If so, then the UE performs a data transmission, or otherwise receives data transmission, using a given one of the beam directions. If no confirmation message was received from the base station prior to expiration of the timeout period, then the UE detects a beam failure event at step 1050, and triggers, or otherwise initiates, a beam recovery procedure at step 1060.

Although the uplink reference signals 1010 are depicted as being transmitted over PUCCHs, it should be appreciated that other types of uplink channels may be used in place of, or in conjunction with, the PUCCHs. For example, the uplink reference signals 1010 could be communicated over PUSCHs. As another example, the uplink reference signals 1010 could be transmitted over uplink grant-free channels. In such an example, the uplink reference signals 1010 may be transmitted over a physical random access channel (PRACH) used for initial access. Alternatively, the uplink reference signals 1010 may be transmitted over a random access channel that spans different time and/or frequency resources than a physical random access channel (PRACH) used for initial access.

Downlink channels can also be used for communicating reference signals used to detect a UE-initiated beam failure event and/or trigger a UE-initiated beam recovery procedure. In an example, each of a plurality of physical downlink control channels ($PDCCH_1, PDCCH_2, \ldots PUCCH_N$) is associated with a downlink transmit beam $w_{ti}$ and/or an uplink receive beam $w_{ri}$, where t indicates a transmit beam, r indicates a receive beam, and i is the index of the downlink channel. For each eNB and UE pair, the UE determines which downlink receive beam $w_{ri}$ to associate with a given PDCCH, and the eNB determines which downlink transmit beam $w_{ti}$ to associate with a given PDCCH. The eNB may transmit a signal (e.g., a reference signal, a command, etc.) over all or some of the PDCCHs using the corresponding downlink transmit beam $w_{ti}$, and the UE may attempt to receive the signals over all or some of the PDCCHs using the corresponding downlink receive beam $w_{ri}$. If upon expiration of a time period, the UE has not detected a signal over any of the PDCCHs, then the UE may determine that a beam failure event has occurred and/or trigger a beam recovery procedure. It should be appreciated that downlink data channels (e.g., PDSCHs, etc.) may be used in place of, or in conjunction with, the PDCCHs for communicating the signals used to detect the beam failure event.

Figure 11:
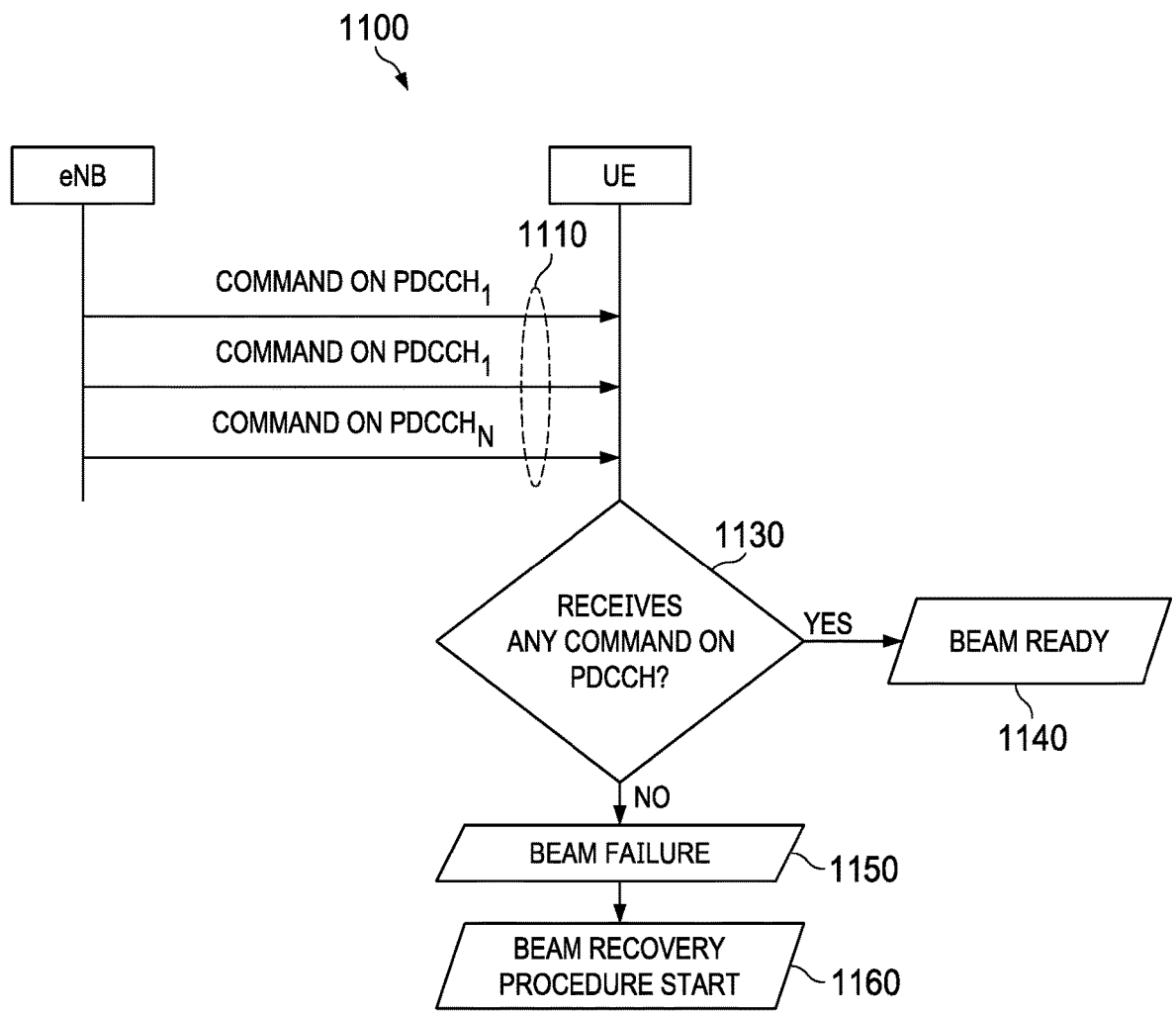
FIG. 11 is a flowchart of an embodiment method for detecting a UE-initiated beam failure event according to downlink reference signal transmissions.

FIG. 11 is a protocol diagram of an embodiment communications sequence 1100 for detecting a beam failure event based on downlink signals 1110. As shown, the base station transmits the downlink signals 1110 over different PDCCHs in a set of PDCCHs. Different downlink transmit beams may be used to transmit the downlink signals 1110 over at least some of the PDCCHs and/or different downlink receive beams may be used to receive, or otherwise attempt to detect, the downlink signals 1110 over at least some of the PDCCHs. In this way, different combinations of TX and RX downlink beams can be evaluated through communication of the downlink signals 1110. At step 1130, the UE determines whether at least one of the downlink reference signals 1110 were successfully received/detected prior to expiration of a timeout period. If so, then the UE performs a data transmission, or otherwise receives data transmission, using a given one of the beam directions. If no confirmation message was received from the base station prior to expiration of the timeout period, then the UE detects a beam failure event at step 1150, and triggers, or otherwise initiates, a beam recovery procedure at step 1160.

A base station may assign a unique signal parameter, or resource, to each UE, and the UE may transmit in accordance with the assigned parameter, or over the assigned resource, in order to request, or otherwise trigger/initiate, a beam recovery procedure. The base station may assign the unique signal-parameter/resource during, or immediately after, a link establishment procedure, during which time the UE establishes an active link with the base station. In one embodiment, the assigned signal-parameter/resource is a UE-specific preamble sequence that is used to transmit a signal over a random access channel/region, e.g., a RACH region, etc. In such an embodiment, UEs may transmit signals carrying their assigned UE-specific preamble sequences over the random access channel in order to request, or otherwise trigger/initiate, a beam recovery procedure, and the base station may identify which UE transmitted a given signal over the RACH based on the UE-specific preamble sequence carried by the signal. In another embodiment, the assigned signal-parameter/resource is a UE-specific resource element (RE), or a UE-specific set of REs, in a control channel or control region of a subframe. In such an embodiment, UEs may transmit signals over their respective UE-specific REs in order to request, or otherwise trigger/initiate, a beam recovery procedure, and the base station may identify which UE transmitted a given one of the signal based on the RE(s) over which the signal was received.

In some other embodiments, a UE may determine when to request, or otherwise trigger/initiate, a beam recovery procedure by monitoring one or more downlink channels, such as physical downlink control channels (PDCCHs) and/or physical downlink shared channels (PDSCHs). PDCCHs may be used to carry downlink control messages. PDSCHs may be used to carry downlink control messages as well as downlink data transmissions. A signal for requesting, or otherwise triggering/initiating, a beam recovery procedure may be transmitted over one or more uplink channels, such as physical uplink control channels (PUCCHs) and/or physical uplink shared channels (PUSCHs). PUCCHs may be used to carry uplink control messages. PUSCHs may be used to carry uplink control messages as well as uplink data.

In one embodiment, UE may monitor one or more downlink channels for a timeout period. If no downlink signals are detected prior to expiration of the timeout period, then the UE may request, or otherwise trigger/initiate, a beam recovery procedure. In general, the UE may detect a downlink signal when a received signal power or quality level of a monitored channel exceeds a predetermined threshold.

In another embodiment, a UE may send signals (e.g., commands, control messages, reference signals, etc.) over one or more uplink channels, and then monitor one or more downlink channels for acknowledgement indications associated with the uplink signals. If no acknowledgement indications are received prior to expiration of a timeout period, then the UE may request, or otherwise trigger/initiate, a beam recovery procedure.

A UE may request, or otherwise trigger/initiate, a beam recovery procedure by transmitting a signal over an uplink channel. The signal may carry, or otherwise be associated with, a signal parameter that has been assigned to the UE. Alternatively, the signal may be transmitted over a resource assigned to the UE. The assigned signal parameter and/or resource may be used by the base station to determine which UE is requesting, or otherwise triggering/initiating, a beam recover procedure upon reception of the corresponding signal.

The channel over which the uplink signal that requests, or otherwise triggers/initiates, the beam recovery event may be different than other control or data channels that are used to transmit other types of UE reports, such as channel quality indicator (CQIs), acknowledgement (ACKs), and/or channel information feedback. The channel may be a grant-based access channel or a grant-free access channel. In order to transmit a signal over a grant-based access channel, a UE is generally required to request, and thereafter obtain, a resource grant. Conversely, a UE may generally be permitted transmit a signal over a grant-free access channel without first obtaining/requesting a resource grant. Various access control mechanisms, such as carrier-sense multiple access with collision avoidance (CSMA/CA), may be used to mitigate collisions between transmissions of different UEs over grant-free access channels.

In conventional 4G LTE networks, a UE that is in an idle state may transmit an initial access request over an Initial Access Random Access Channel (IA-RACH) in order to request that PUSCH resources be scheduled for an uplink data transmissions of the UE. However, in conventional 4G LTE networks, UEs that are in the connected state are generally not permitted to transmit signals over random access channels. In embodiments of this disclosure, a UE that is operating in the connected state may transmit a preamble sequence over a random access channel, in order to request, or otherwise trigger/initiate, a beam recovery event. In one example, the preamble sequence is transmitted over a random access channel that is different than the IA-RACH. In such an example, the random access channel over which the preamble sequence is transmitted over may be associated with a different carrier frequency than the IA-RACH.

Figure 12:
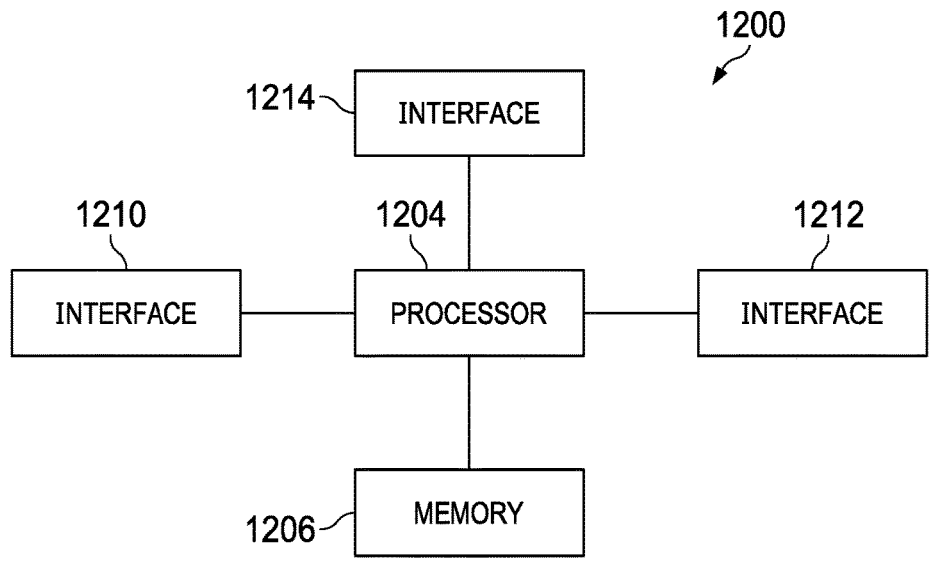
FIG. 12 is a block diagram of an embodiment processing system for performing methods described herein.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. A means for configuring a context for a UE may include processor 1204. In an embodiment, the memory 1206 includes a non-transitory computer readable storage medium that stores programming for execution by the processor 1204. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a network TRP, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
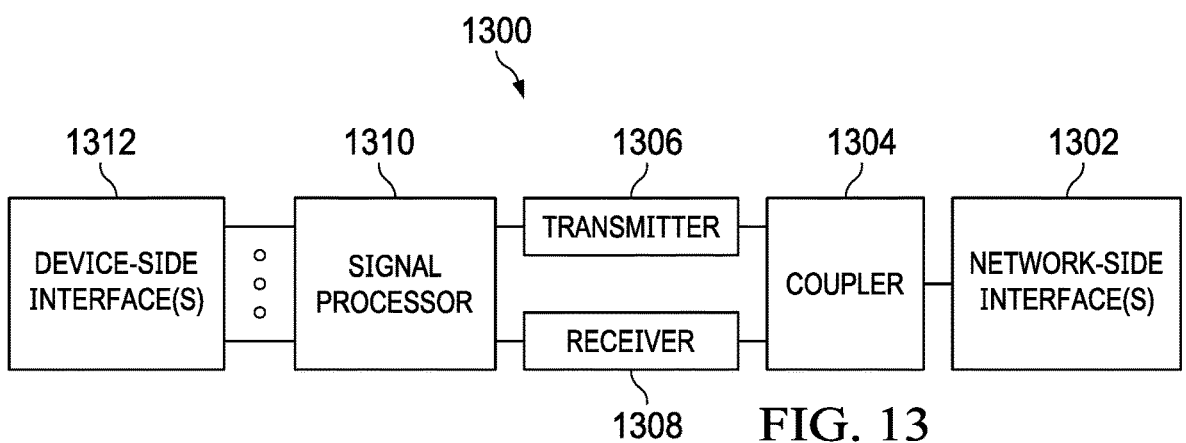
FIG. 13 is a block diagram of a transceiver adapted to transmit and receive signaling over a telecommunications network according to example embodiments described herein.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The network-side interface 1302 may also include any component or collection of components adapted to transmit or receive signaling over a short-range interface. The network-side interface 1302 may also include any component or collection of components adapted to transmit or receive signaling over a Uu interface. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. A means for transmitting an initial message of an access procedure may include transmitter 1306. The receiver 1308 may include any component or collection of components (e.g., down-converter, low noise amplifier, etc.) adapted to convert a carrier signal received over the network-side interface 1302 into a baseband signal. A means for receiving mobile subscriber identifiers, initial downlink messages of access procedures, and forwarded requests to connect to a network may include receiver 1308.

The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    determining, by a user equipment (UE), a quality of one or more downlink reference signals from a base station;
    detecting, by the UE, a beam failure event associated with one or more beams based on the quality of the one or more downlink signals; and
    transmitting, by the UE, a media access control (MAC) control element (CE) transmission for beam failure recovery responsive to the beam failure event, wherein the MAC CE transmission includes an index associated with a resource that carries a signal indicating a new beam direction suitable for transmissions to the UE, the index being different from a beam index the index indicating a time-frequency resource that carries the signal.

2. The method of claim 1, wherein the one or more downlink signals is received over a first carrier frequency, and wherein the MAC CE transmission are transmitted over a second carrier frequency different from the first carrier frequency.

3. The method of claim 1, the detecting comprising:
detecting, by the UE, the beam failure event associated with the one or more beams based on a number of downlink reference signal measurements failing to exceed a threshold during a time-out period.

4. The method of claim 3, the downlink reference signal measurements including signal qualities of the one or more downlink signals or power levels of the one or more downlink reference signals.

5. The method of claim 1, wherein the MAC CE transmission indicates a recommendation to initiate a beam management procedure.

6. The method of claim 1,
wherein the index included in the MAC CE transmission indirectly indicates the new beam direction.

7. The method of claim 1,
wherein the index included in the MAC CE transmission is associated with the time-frequency resource that carries a reference signal.

8. A user equipment (UE) comprising:
at least one processor; and
a non-transitory computer readable storage medium storing programming for execution by the at least one processor, the programming including instructions to cause the UE to:
determine a quality of one or more downlink signals from a base station;
detect a beam failure event associated with one or more beams based on the quality of the one or more downlink signals; and
transmit a media access control (MAC) control element (CE) transmission for beam failure recovery responsive to the beam failure event, wherein the MAC CE transmission includes an index associated with a resource that carries a signal indicating a new beam direction suitable for transmissions to the UE, the index being different from a beam index the index indicating a time-frequency resource that carries the signal.

9. The UE of claim 8, wherein the one or more downlink signals is received over a first carrier frequency, and wherein the MAC CE transmission are transmitted over a second carrier frequency different from the first carrier frequency.

10. The UE of claim 8, the instructions to cause the UE to detect the beam failure event include instructions to:
detect the beam failure event associated with the one or more beams based on a number of downlink reference signal measurements failing to exceed a threshold during a time-out period.

11. The UE of claim 10, the downlink reference signal measurements including signal qualities of the one or more downlink signals or power levels of the one or more downlink reference signals.

12. The UE of claim 8, wherein the MAC CE transmission indicates a recommendation to initiate a beam management procedure.

13. A method comprising:
transmitting, by a base station to a user equipment (UE), one or more downlink signals; and
receiving, by the base station from the UE, a media access control (MAC) control element (CE) transmission for beam failure recovery responsive to a beam failure event associated with one or more beams detected by the UE based on a quality of the one or more downlink signals, wherein the MAC CE transmission includes an index associated with a resource that carries a signal indicating a new beam direction suitable for transmissions to the UE, the index being different from a beam index the index indicating a time-frequency resource that carries the signal.

14. The method of claim 13, wherein the one or more downlink signals is transmitted over a first carrier frequency, and wherein the MAC CE transmission are received over a second carrier frequency different from the first carrier frequency.

15. The method of claim 13, wherein the beam failure event is based on a number of downlink reference signal measurements failing to exceed a threshold during a time-out period.

16. The method of claim 15, the downlink reference signal measurements including signal qualities of the one or more downlink signals or power levels of the one or more downlink reference signals.

17. The method of claim 13, the method further comprising:
communicating, by the base station with the UE, according to the new beam direction.

18. The method of claim 13, wherein the MAC CE transmission indicates a recommendation to initiate a beam management procedure, the method further comprising:
initiating, by the base station, the beam management procedure.

19. A base station comprising:
at least one processor; and
a non-transitory computer readable storage medium storing programming for execution by the at least one processor, the programming including instructions to cause the base station to:
transmit, a user equipment (UE), one or more downlink reference signals; and
receive, from the UE, a media access control (MAC) control element (CE) transmission for beam failure recovery responsive to a beam failure event associated with one or more beams detected by the UE based on a quality of the one or more downlink signals, wherein the MAC CE transmission includes an index associated with a resource that carries a signal indicating a new beam direction suitable for transmissions to the UE, the index being different from a beam index the index indicating a time-frequency resource that carries the signal.

20. The base station of claim 19, wherein the one or more downlink signals is transmitted over a first carrier frequency, and wherein the MAC CE transmission are received over a second carrier frequency different from the first carrier frequency.

21. The base station of claim 19, wherein the beam failure event is based on a number of downlink reference signal measurements failing to exceed a threshold during a time-out period.

22. The base station of claim 21, the downlink reference signal measurements including signal qualities of the one or more downlink signals or power levels of the one or more downlink reference signals.

23. The base station of claim 19, the programming further including instructions to cause the base station to:
  communicate, with the UE, according to the new beam direction.

24. The base station of claim 19, wherein the MAC CE transmission indicates a recommendation to initiate a beam management procedure, the programming further including instructions to cause the base station to:
  initiate the beam management procedure.

\* \* \* \* \*